United States Patent
Stein (10) Patent No.: US 12,376,568 B2
(45) Date of Patent: Aug. 5, 2025

(54) REFILLABLE DOG PUZZLE CHEW TOY FABRICATED FOR POWERFUL DOG CHEWERS

(71) Applicant: Daniel Evan Stein, Sewickley, PA (US)

(72) Inventor: Daniel Evan Stein, Sewickley, PA (US)

( * ) Notice: Subject to any disclaimer, the term of this patent is extended or adjusted under 35 U.S.C. 154(b) by 0 days.

(21) Appl. No.: 18/542,708

(22) Filed: Dec. 17, 2023

(65) Prior Publication Data
US 2024/0196861 A1    Jun. 20, 2024

Related U.S. Application Data

(60) Provisional application No. 63/433,435, filed on Dec. 17, 2022.

(51) Int. Cl.
*A01K 15/02* (2006.01)
*A01K 5/01* (2006.01)

(52) U.S. Cl.
CPC .......... *A01K 15/026* (2013.01); *A01K 5/0114* (2013.01)

(58) Field of Classification Search
CPC ... A01K 15/026; A01K 5/0114; A01K 15/025
See application file for complete search history.

(56) References Cited

U.S. PATENT DOCUMENTS

| | | | | |
|---|---|---|---|---|
| 11,503,806 | B1 * | 11/2022 | Mullin | A46B 11/0041 |
| 2011/0083608 | A1 * | 4/2011 | Markham | A01K 5/0114 |
| | | | | 119/51.01 |
| 2012/0204809 | A1 * | 8/2012 | Axelrod | A01K 15/026 |
| | | | | 119/709 |
| 2013/0118417 | A1 * | 5/2013 | Teconchuk | F16B 2/26 |
| | | | | 119/710 |
| 2014/0048017 | A1 * | 2/2014 | Mainini | A01K 15/02 |
| | | | | 119/51.01 |
| 2014/0360434 | A1 * | 12/2014 | Yacov | A01K 7/00 |
| | | | | 119/51.5 |
| 2016/0302389 | A1 * | 10/2016 | Christensen | A01K 15/021 |
| 2019/0261601 | A1 * | 8/2019 | Stone | A01K 15/025 |
| 2021/0212290 | A1 * | 7/2021 | Stern | A01K 15/026 |
| 2022/0046895 | A1 * | 2/2022 | Kolesar | A01K 5/0114 |
| 2024/0237613 | A1 * | 7/2024 | Nishida | A01K 15/025 |

\* cited by examiner

*Primary Examiner* — Trinh T Nguyen
(74) *Attorney, Agent, or Firm* — ACKER WOOD IP LAW, LLC; Gwen A. Acker Wood (57) ABSTRACT

The present invention provides a refillable, multi-part, interactive, dog puzzle chew toy device designed for powerful dog chewers that is high strength, durable, impact resistant, long-lasting, dishwasher safe, and easy on a dog's teeth and gums. The device comprises an annular rotatable cap and a cylindrical body having a plurality of apertures therein. The cylindrical body of the device is configured to contain contents such as dog treats, dog or human food, other suitable ingestible items, and/or high quality squeakers in the cylindrical body. The device may be fabricated in a variety of sizes and shapes and wall thicknesses to accommodate a range of dog sizes, bite strengths, and levels of difficulty for accessing its contents. The durable dog puzzle chew toy device of the invention thus provides dogs with an enjoyable, long lasting, stimulating treat and toy experience.

11 Claims, 8 Drawing Sheets

REFILLABLE DOG PUZZLE CHEW TOY FABRICATED FOR POWERFUL DOG CHEWERS

CROSS REFERENCE TO RELATED APPLICATIONS

The present application claims priority to U.S. Provisional Patent Application No. 63/433,435, filed Dec. 17, 2022, which is incorporated by reference herein in its entirety.

FIELD OF THE INVENTION

The present invention is directed to dog toys and, in particular, to a refillable, multi-part, interactive, durable dog puzzle chew toy device designed for powerful dog chewers containing dog treats, food, other ingestible items, or dog squeakers therein.

BACKGROUND OF THE INVENTION

Dog puzzle toys, or dog enrichment toys, are purchased by millions of dog owners for their puppies or grown dogs to provide IQ training, mental and brain stimulation, and to prevent boredom in dogs. These toys typically include treats, kibbles, dog food and/or human food, making feeding time easier for the owner and more enjoyable for the dog.

Existing dog puzzle toys, however, do not keep dogs engaged for very long and/or are easily destroyed, especially by dogs that are powerful or tough chewers, referred to as "super chewers." Dog puzzle toys made of hard plastics are easily shredded by these super chewers whereas rubbery toys that are designed for super chewers are very limited by the types of treats or food that can be used with them. In addition, many dog puzzle toys have large openings intended to be filled with treats or food but the contents of the toys can be easily retrieved by dogs quickly and with little effort. There exists a need, therefore, for a dog puzzle chew toy that overcomes these shortcomings.

SUMMARY OF THE INVENTION

The present invention fulfills this need by providing a multi-part, refillable, interactive, dog puzzle chew toy designed for dogs that are tough chewers that is high strength, impact resistant, long-lasting, can contain all shapes and sizes of treats and food enclosed in the toy, and provided in a variety of sizes and shapes to better fit a range of dog sizes and levels of difficulty for accessing the treats or food. The dog puzzle chew toy of the invention thus provides dogs with an enjoyable, long lasting, stimulating treat experience so that their owners can enjoy peace and quiet.

In an aspect of the invention, there is provided a refillable dog puzzle chew toy for powerful dog chewers comprised of a cylindrical body and an annular rotatable cap. The cylindrical body has an open upper end and a closed lower end and defines an interior opening therein. The cylindrical body has a plurality of apertures therethrough. The annular rotatable cap is comprised of an upper closed end and an annular skirt projecting downwardly and an annular first insert defining an opening therein having an outer wall, an inner wall, an upper end, and a threaded lower end, in which the upper end is injection-molded within the annular skirt of the rotatable cap. The invention further comprises an annular second insert defining an opening therein, the annular second insert having an outer wall, an inner wall, an upper end, and a lower end. The inner wall of the annular second insert is threaded and is configured to mate with the threaded lower end of the annular first insert. The annular second insert is injection-molded within the interior opening of the upper end of the cylindrical body. The rotatable cap is configured to fit tightly and securely atop the upper end of the circular body when the threads of the annular first insert is rotatably mated with the threads of the annular second insert.

The interior opening in the cylindrical body is configured to receive one or more dog treats, dog food, human food, suitable ingestible items, or high quality items such as dog squeakers, and the plurality of apertures in the cylindrical body are configured to allow a dog access to the contents of the cylindrical body when the dog plays with and chews on the dog puzzle chew toy.

In another aspect of the invention, there is provided a refillable dog puzzle chew toy for powerful dog chewers comprised of a cylindrical body and an annular rotatable cap. The cylindrical body has an open upper end and a closed lower end and defines an interior opening therein. The upper end of the cylindrical body is angled slightly outwardly and includes an aperture therethrough. The cylindrical body has a plurality of apertures therethrough. The annular rotatable cap comprises a rotatable cap top having upper closed end and an annular skirt projecting downwardly. The upper closed end of the rotatable cap top has a plurality of openings therein and the annular skirt has a plurality of vertical grooves thereon. The annular rotatable cap further comprises an annular first insert having an upper portion, a middle portion, and a threaded lower portion, the upper portion having a plurality of flanges projecting upwardly in which each of the plurality of flanges is configured to fit within one of the plurality of openings in the rotatable cap. The middle portion is comprised of an annular band having a plurality of vertical flanges projecting outwardly. The annular second insert is injection-molded within the annular skirt of the rotatable cap top.

This aspect of the invention further comprises an annular second insert defining an interior threaded opening therein. The annular second insert has an upper end, a lower end, and an annular band therebetween having a plurality of vertical flanges projecting outwardly. The annular second insert is injection-molded within the upper end of the cylindrical body. Closure of the dog puzzle chew toy is accomplished by screwing the lower threaded portion of the annular first insert into the threaded opening of the annular second insert.

The plurality of vertical flanges on the annular band of the annular first insert and the plurality of flanges on the annular second insert are configured to provide a tight and secure fit within the annular skirt of the rotatable cap top and within the upper end of the cylindrical body, respectively, when the rotatable cap is rotated within the annular second insert to close the cap within the body. This tight fit and secure fit ensures that the contents of the cylindrical body is locked in place.

The interior opening in the cylindrical body is configured to receive one or more dog treats or dog food, and the plurality of apertures in the cylindrical body are configured to allow a dog access to the one or more dog treats, dog food, human food, other suitable ingestible items, or high quality dog squeakers.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

As used herein, the terms "apertures" and "openings" are interchangeable.

As used herein, the term "contents" is meant to refer, but is not limited to, one or more treats, dog food, human food, other suitable ingestible dog materials, and/or dog squeakers placed within the cylindrical body of the invention.

As used herein, the terms "powerful chewers," "tough chewers," and "super chewers" are interchangeable.

Figure 1:
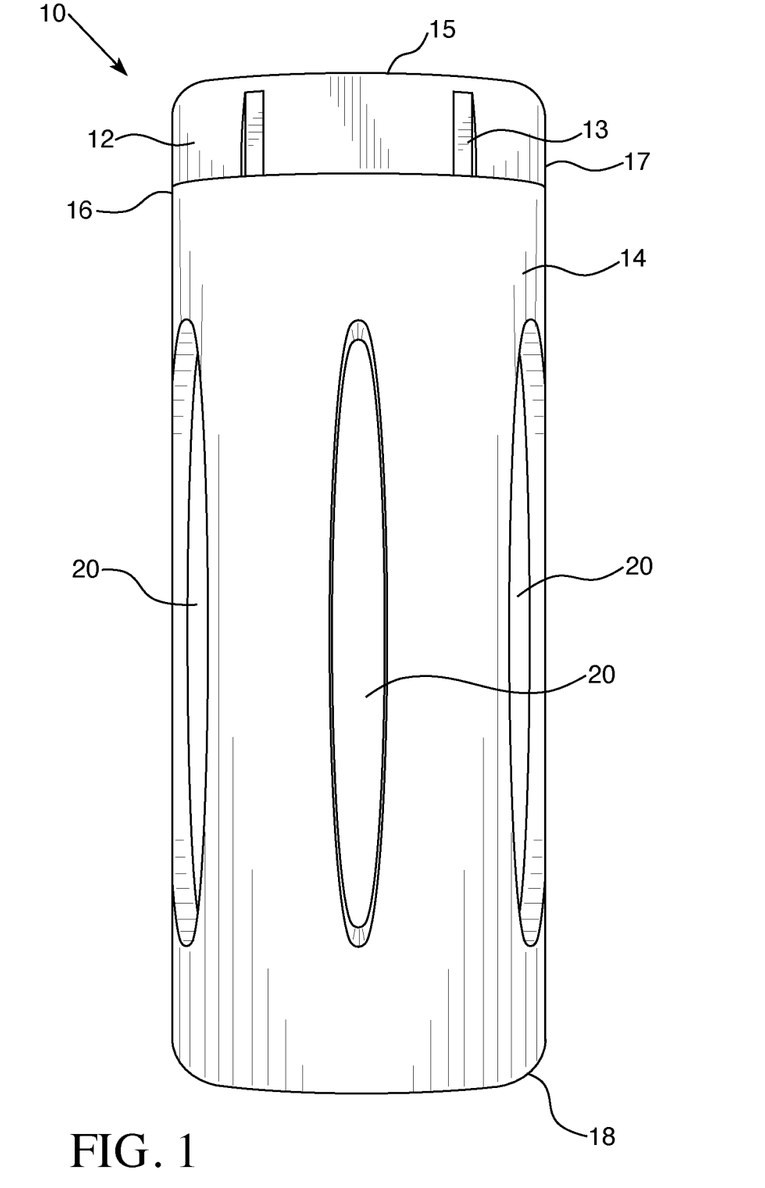
FIG. 1 is a front perspective view showing the closed dog puzzle chew toy with vertical apertures in its cylindrical body prior to filling the cylindrical body with a treats, food, an ingestible item, or a dog squeaker, in accordance with an embodiment of the invention.
Figure 2:
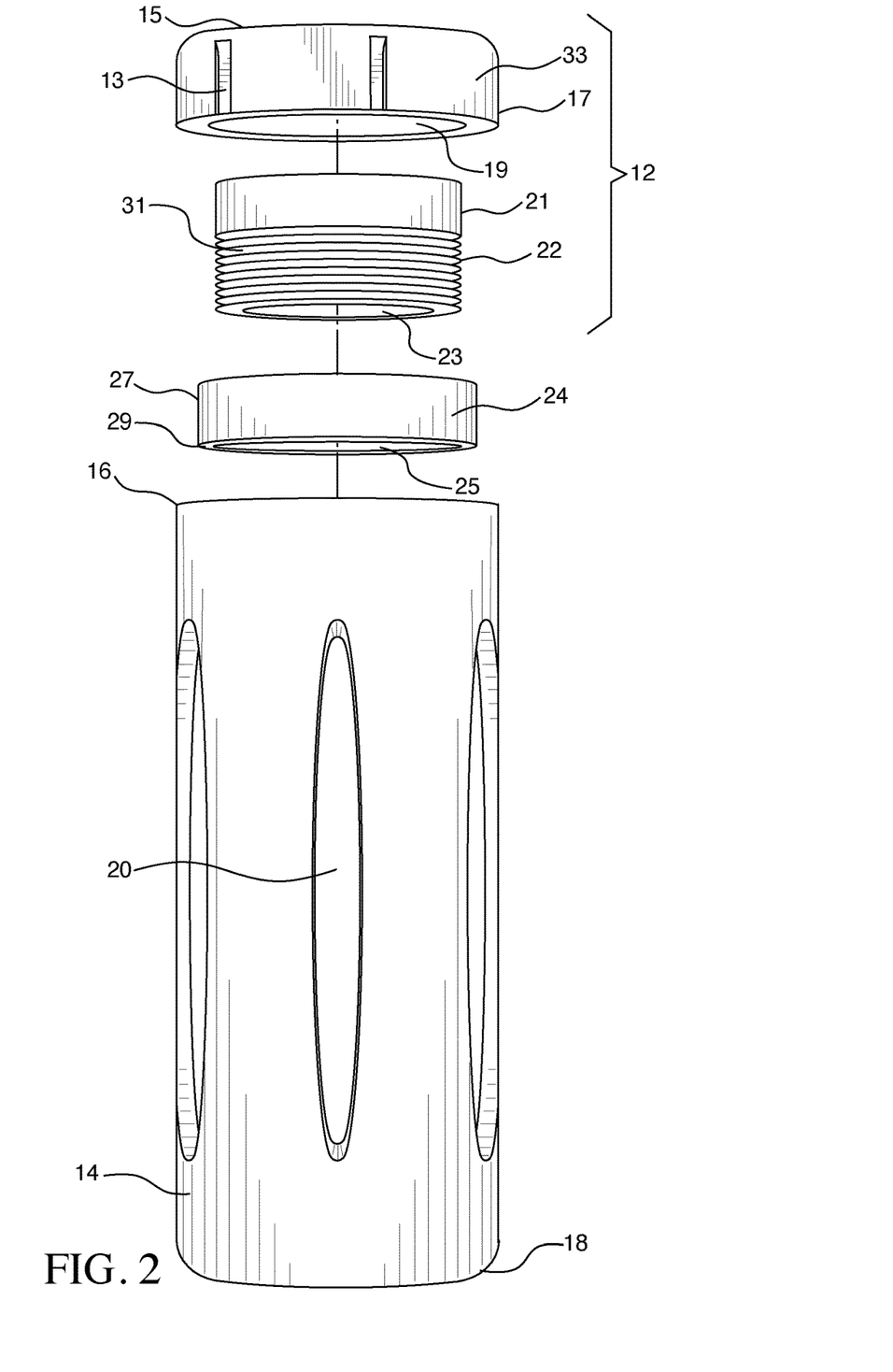
FIG. 2 is an exploded front perspective view showing the multiple parts of the dog puzzle chew toy with vertical apertures in its cylindrical body prior to filling the body with a treat, food, ingestible item, or dog squeaker in accordance with an embodiment of the invention.

Referring now to FIGS. 1-7, an embodiment of the present invention comprises a multi-part, refillable dog puzzle chew toy 10 fabricated for powerful dog chewers 10 comprised of a cylindrical body 14 and an annular rotatable cap 12 (shown in FIG. 1). As shown in FIG. 2, the annular rotatable cap 12.

Figure 5:
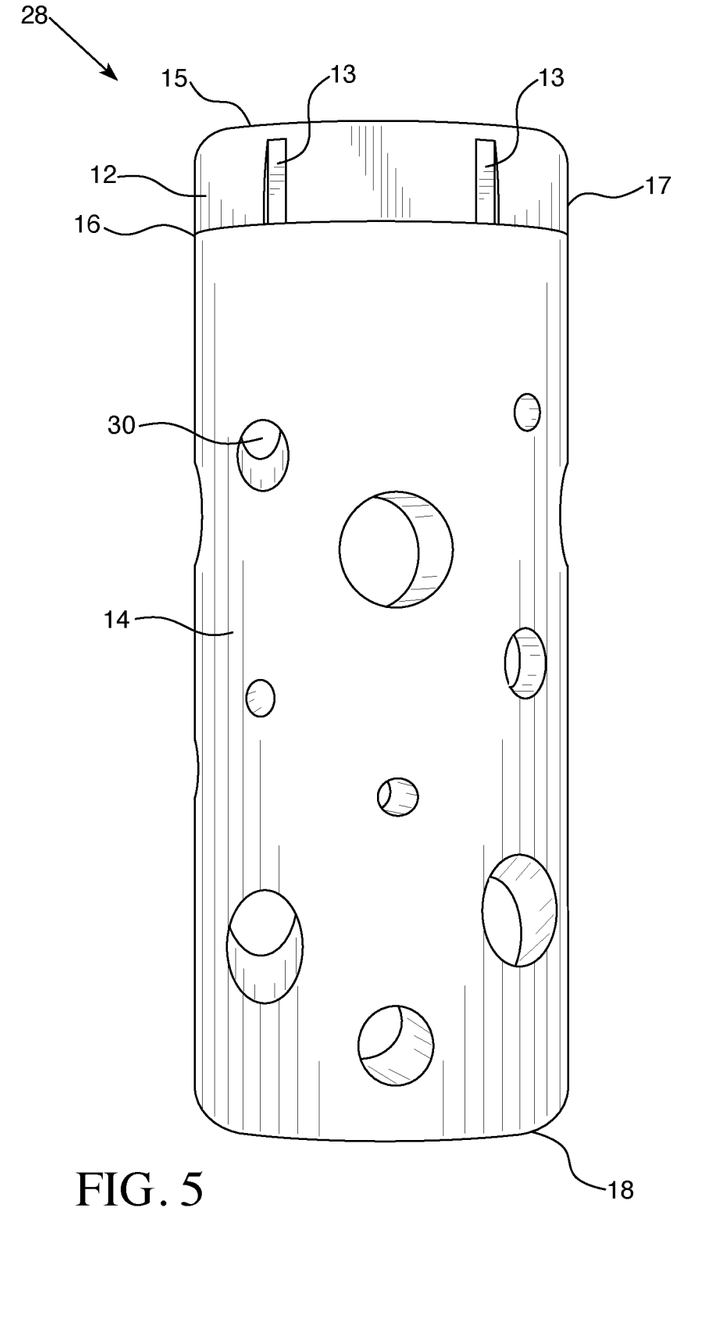
FIG. 5 is a front perspective view showing the closed dog puzzle chew toy with round apertures in its cylindrical body prior to filling the body with a treat, food, ingestible item, or dog squeaker, in accordance with an embodiment of the invention.
Figure 6:
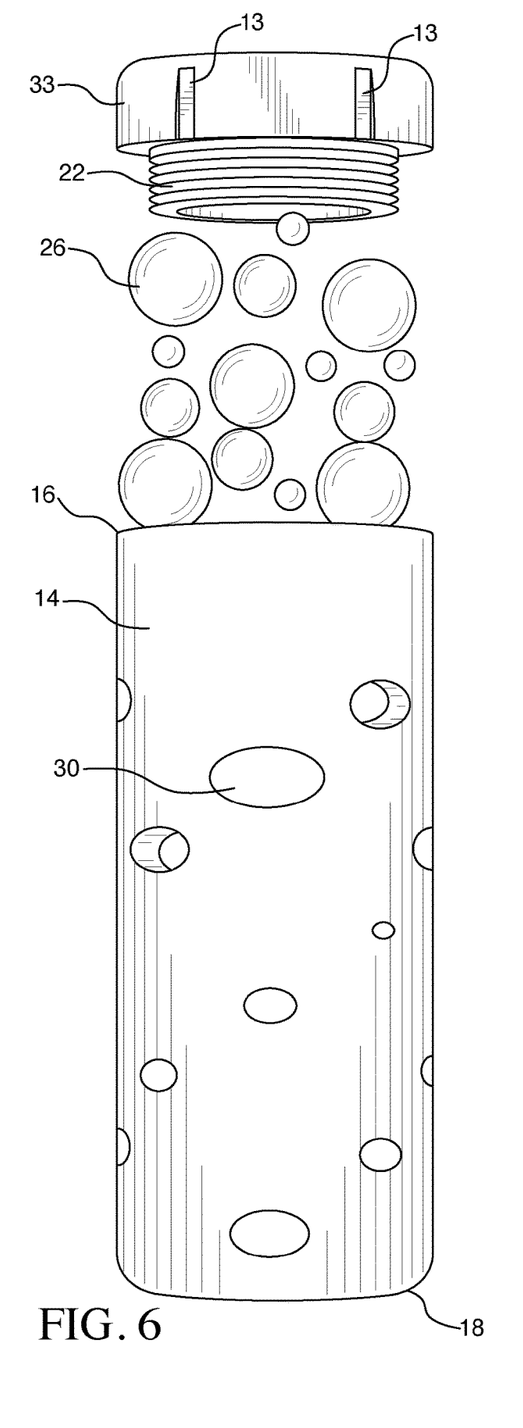
FIG. 6 is an exploded front perspective view showing the open dog puzzle chew toy with round apertures and a plurality of treats, food or ingestible items semi-inserted into the cylindrical body, in accordance with an embodiment of the invention.
Figure 7:
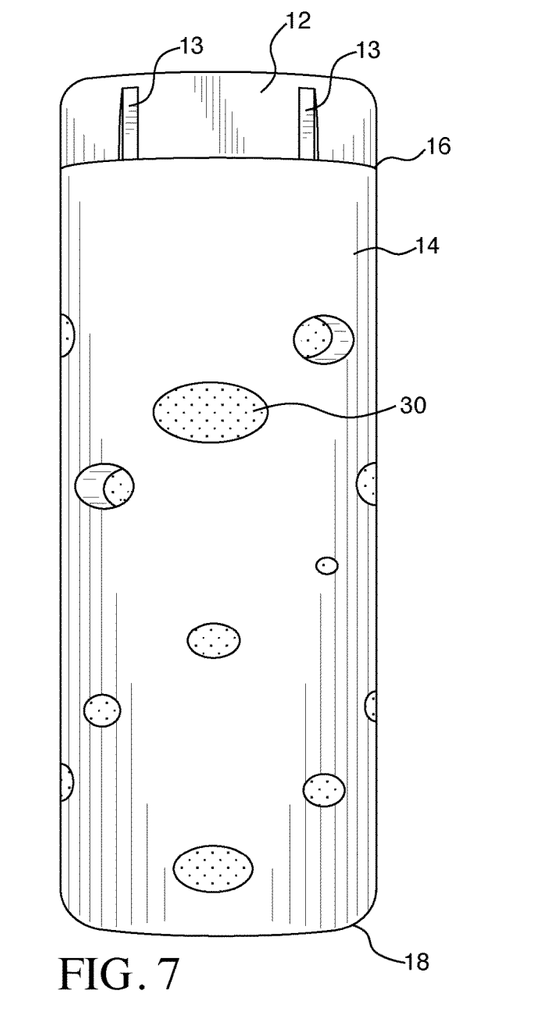
FIG. 7 is front perspective view showing the closed dog puzzle chew toy with round apertures in which the plurality of treats, food or ingestible items are fully inserted within the cylindrical body, in accordance with an embodiment of the invention.

As shown in FIG. 2, the cylindrical body 14 has an open upper end 16 and a closed lower end 18 in which the cylindrical body defines an interior opening therein. The cylindrical body 14 has a plurality of apertures 20 therethrough. As shown in FIGS. 1-4, the plurality of apertures may comprise vertical openings. The apertures 20 in the cylindrical body also may comprise round openings, as shown in FIGS. 5-7. Other shaped openings may include, without limitation, square openings, rectangular openings, triangular openings, or combinations thereof.

Referring still to FIG. 2, the annular rotatable cap 12 includes an annular cap top 33 comprised of an upper closed end 15, an annular skirt 17 projecting downwardly, and a plurality of grooves 13 on the surface of the annular skirt 17. The grooves 13 assist and facilitate rotation of the annular rotatable cap 12 onto and off the cylindrical body 14 by a user. The annular rotatable cap 12 also includes an annular first insert 31 defining an opening therein 23, an upper portion 21, and a threaded lower portion 22.

The dog puzzle chew toy 10 further comprises an annular second insert 24 defining an opening therein 25, an outer wall 27, and an inner wall 29. The inner wall 29 of the annular second insert 24 is threaded, which threading is configured to mate with the threaded lower portion 22 of the annular first insert 31. The upper portion 21 of the annular first insert 31 is injection-molded within the annular skirt 17 of the annular cap top 33; and the annular second insert 24 is injection-molded within the interior opening of the cylindrical body 14 at its upper end 16. Closure of the dog puzzle chew toy 10 is accomplished by screwing the threaded lower portion 22 of the annular first insert 31 into the inner threaded wall 29 of the annular second insert 24 located within the cylindrical body 14.

Figure 3:
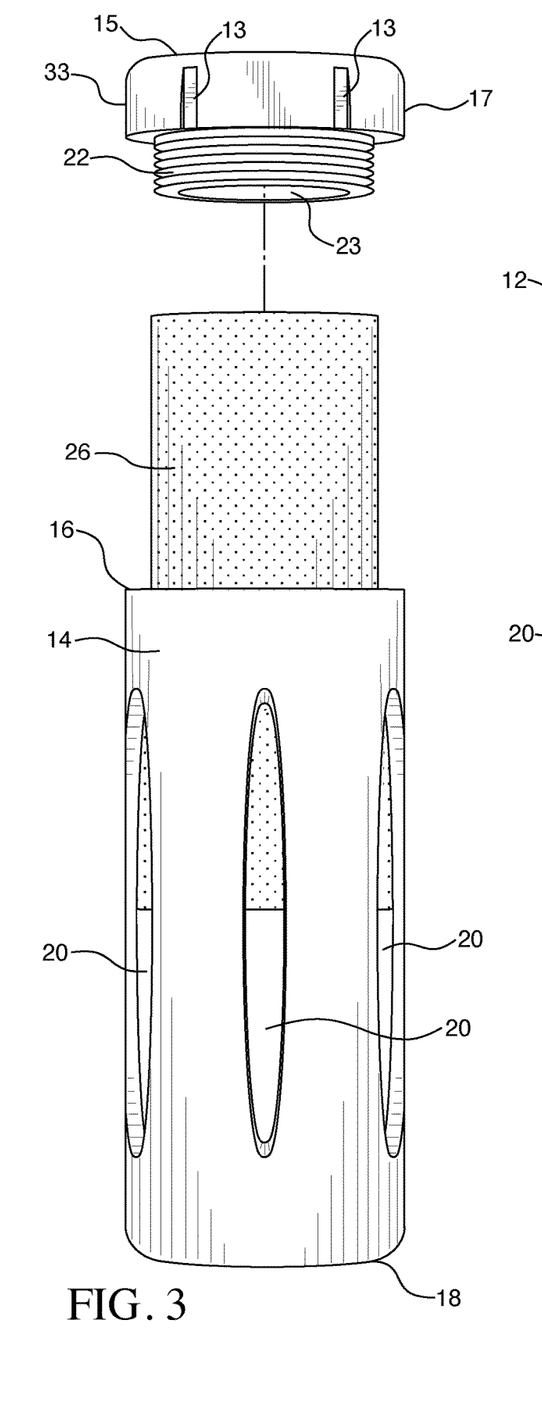
FIG. 3 is an exploded front perspective view showing annular rotatable cap and the cylindrical body of the dog puzzle chew toy with vertical apertures and a treat semi-inserted into the cylindrical body, in accordance with an embodiment of the invention.
Figure 4:
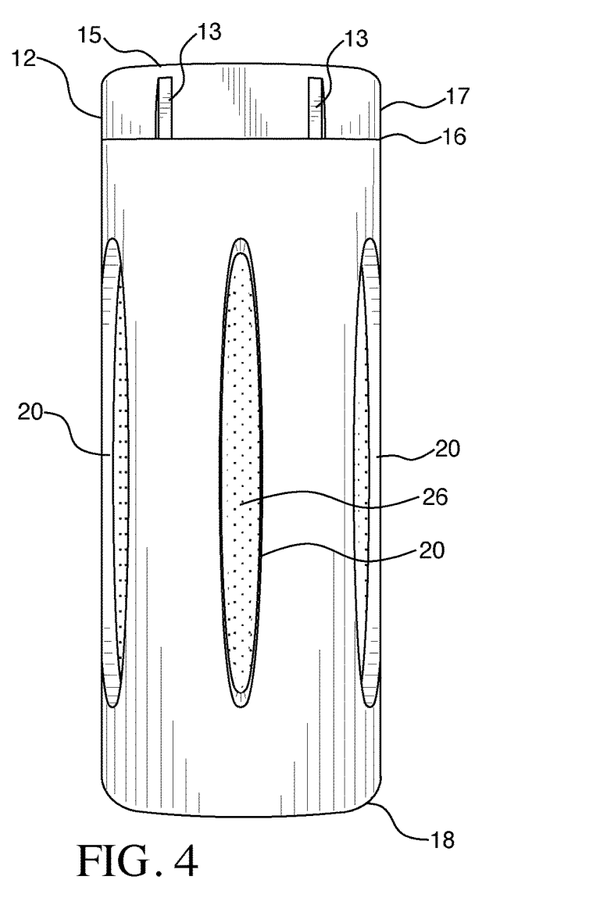
FIG. 4 is front perspective view showing the closed dog puzzle chew toy with vertical apertures showing the treat viewed through the vertical apertures in which a treat is fully inserted within the cylindrical body, in accordance with an embodiment of the invention.

As shown in FIG. 3, the plurality of apertures of the dog puzzle chew toy 10 is comprised of vertical openings 20. Prior to screwing the annular rotatable cap 12 onto the cylindrical body 14, the cylindrical body 14 may be filled with contents which include, without limitation, one or more treats, dog food, human food, other suitable ingestible items, or high quality dog squeakers 26. FIG. 3 shows the dog puzzle chew toy 10 when closed after being filled with its contents by securely fitting the annular rotatable cap 12 onto the cylindrical body 14 by screwing the threaded lower portion 22 of the annular first insert 31 into the threading of the annular second insert 24. The contents of the cylindrical body 40 can be seen, smelled, or viewed by a dog via the plurality of vertical openings 20 which also provides a dog access to the contents therein.

FIG. 5 shows another configuration of the dog puzzle chew toy 10 in which the apertures are round openings 30. FIG. 6 shows the cylindrical body 14 with round holes 30 and the annular rotatable cap 12 in which the contents 26 are being inserted into the cylindrical body 14. FIG. 7 shows the closed the dog puzzle chew toy 10 after the annular rotatable cap 12 has been threadably fitted onto the cylindrical body 14 with the contents showing through the round openings 30.

Figure 8:
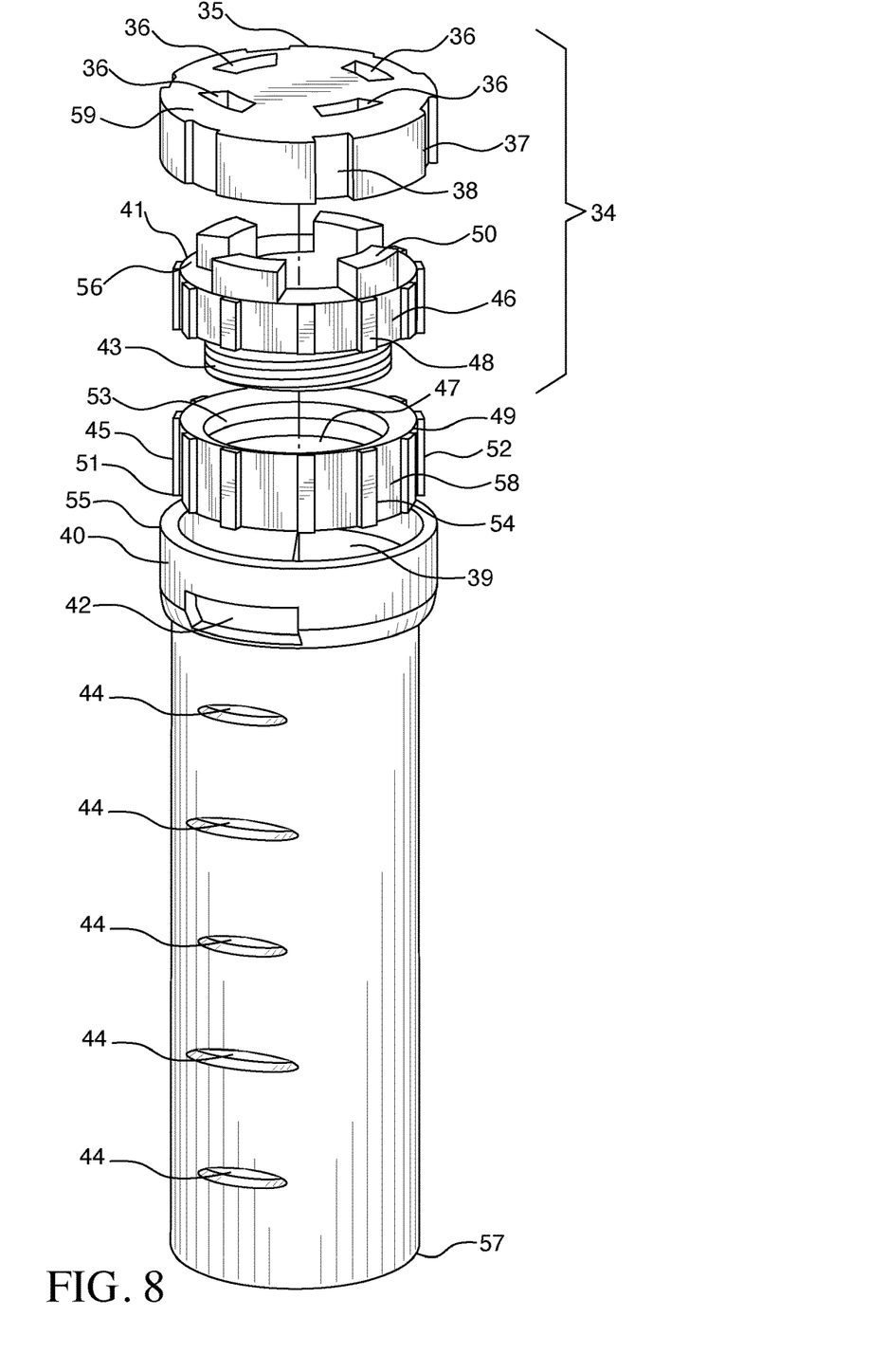
FIG. 8 is an exploded front perspective view showing the multiple part of the dog puzzle chew toy with horizontal apertures in its cylindrical body prior to filling the cylindrical body with a treat, food, ingestible item, or dog squeaker, in accordance with an embodiment of the invention.
Figure 9:
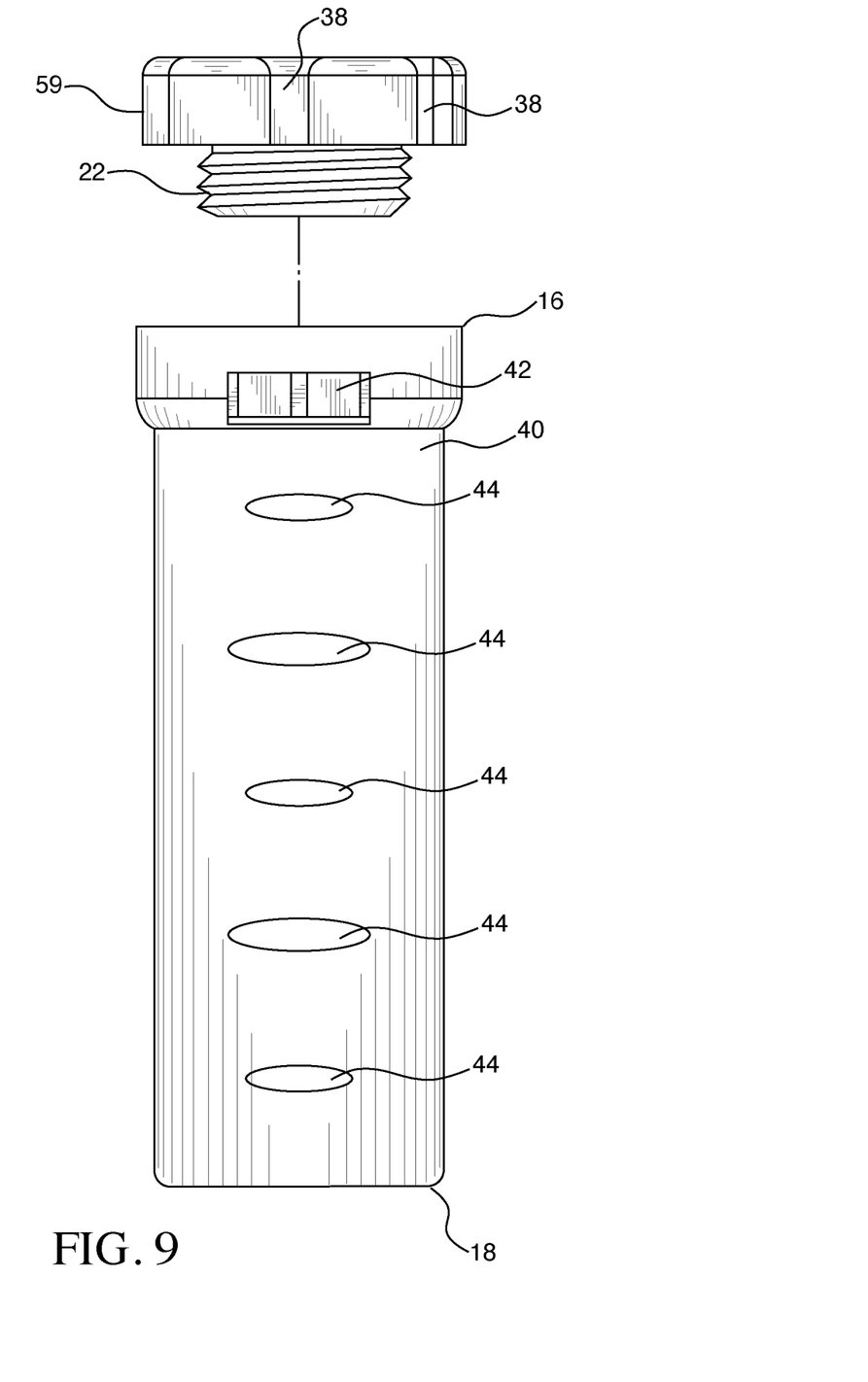
FIG. 9 is an exploded front perspective view showing the annular rotatable cap and the cylindrical body of the dog puzzle chew toy with horizontal apertures, in accordance with an embodiment of the invention.
Figure 10:
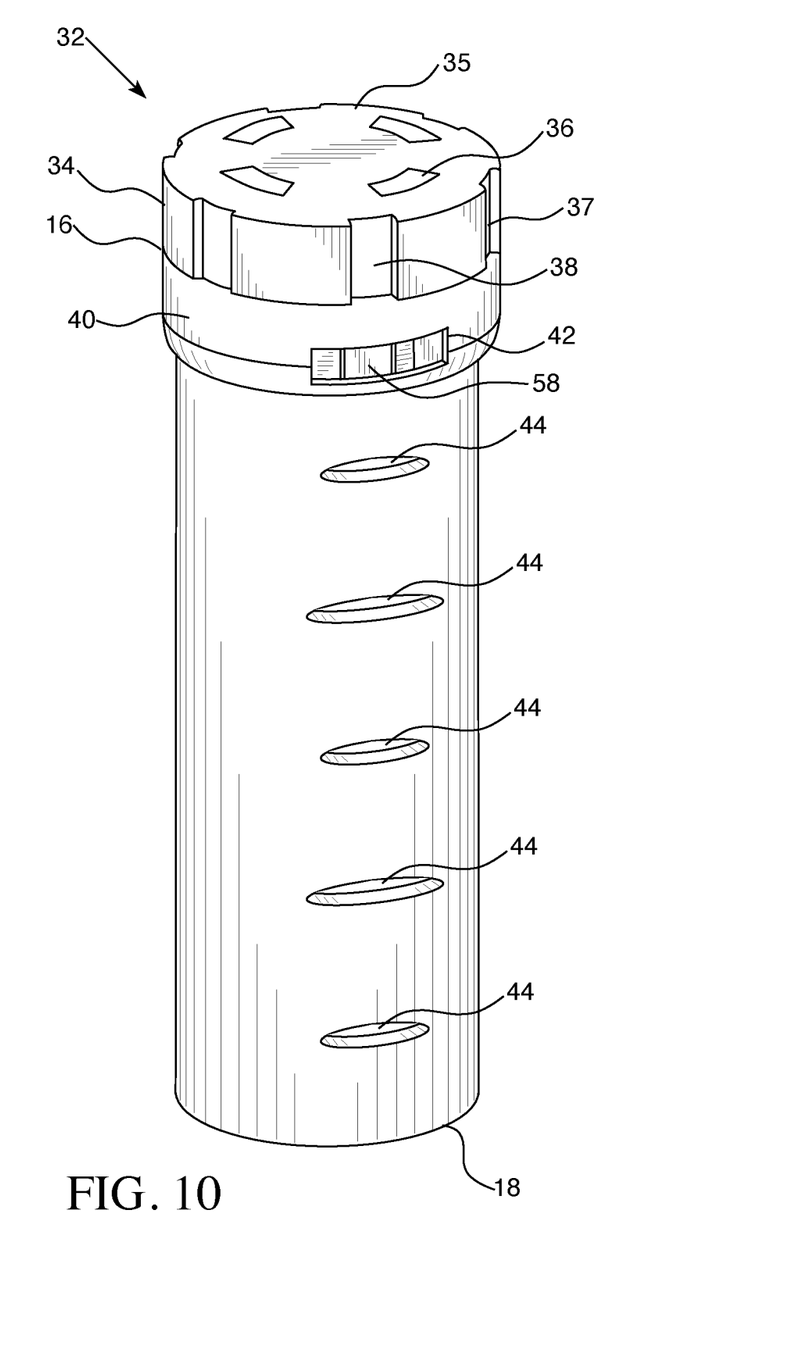
FIG. 10 is front perspective view showing the closed dog puzzle chew toy with horizontal apertures comprised of a plurality of apertures of the annular rotatable cap and the aperture in the upper end of the cylindrical body in which the annular second insert can be viewed therein, accordance with an embodiment of the invention.

In another embodiment of the invention, shown in FIGS. 8-10, the refillable dog puzzle chew toy fabricated for powerful dog chewers 32 is comprised of a multi-part cylindrical body 40 and an annular rotatable cap 34 (shown in FIG. 10). The cylindrical body 40 has an open upper end 55, a closed lower end 57 which defines an interior opening therein 39, and a plurality of apertures therethrough 44. The upper end 55 of the cylindrical body 40 is angled slightly outwardly and includes an aperture 42 therethrough which, when fully assembled, shows the annular second insert 58 positioned in the upper end 55 of the cylindrical body 40.

The annular rotatable cap 34 is comprised of an annular cap top 59 and an annular first insert 56. The annular cap top 59 is comprised of an upper closed end 35 and an annular skirt 37 projecting downwardly. The annular cap top 59 has a plurality of apertures 34 therethrough and the annular skirt 37 has a plurality of vertical grooves 38 thereon. The vertical grooves 38 facilitate rotation of the annular rotatable cap 34 when opening and closing the rotatable cap on the cylindrical body by a user.

The annular first insert 56 is comprised of an upper portion 41, an annular band middle portion 46, and a threaded lower portion 43. The upper portion 41 includes a plurality of flanges 50 projecting upwardly and the annular band middle portion 46 includes a plurality of flanges 48 projecting outwardly. Each of the plurality of upwardly projecting flanges 50 is injection-molded into the plurality of corresponding apertures 36 in the annular cap top 59, and the middle portion annular band 46 is injection-molded into the annular skirt 37 of the annular cap top 59.

The dog puzzle chew toy 32 further comprises an annular second insert 58 comprised of an annular band 52 which defines an interior threaded opening therein 47. The annular second insert 58 has an upper end 49 and a lower end 51 and the annular band 52 includes a plurality of vertical flanges 54 projecting outwardly from the annular band 52. The annular second insert 58 is injection-molded within the upper end 49 of the cylindrical body 40.

The plurality of vertical flanges 46 on the annular first insert 56 and the plurality of vertical flanges on the annular second insert 58 are configured to increase the surface area of the inserts' outer surface which provide strong friction forces so that the annular first insert 56 remains tightly and securely in place within the annular skirt 37 of the annular top cap 59, and so that the annular band 52 of the annular second insert 58 remains tightly and securely in place within the cylindrical body 40. This provides a long-lasting puzzle dog chew toy 32 for a powerful dog chewer as well as ensuring that its contents are locked inside the cylindrical body 40 while the powerful dog chewer is playing with the toy 32. In addition, essentially there are no gaps present between the rotatable annular cap 34 and the cylindrical body 40 as well as no pull points for a dog to latch itself on. Further, the rounded design of the cylindrical body 40 also prevents any pull points as well as providing an interactive roll action which rewards a dog's natural foraging instincts.

Closure of the dog puzzle chew toy comprises threadably screwing the threaded lower portion 43 of the first annular insert 56 into the interior threaded opening 47 of the annular second insert 58 positioned within the upper end 55 of the cylindrical body 40. As with the first embodiment, the interior opening 39 in the cylindrical body 40 is configured to receive one or more dog treats, dog food or human food, and the plurality of apertures 44 in the cylindrical body 40 are configured to allow a dog access to the one or more treats or food therein.

The annular cap top, the upper and middle portions of the annular first insert, the cylindrical body, and the annular band of the annular second insert may be fabricated from durable, high strength, impact resistant rubber-like materials such as thermoplastic elastomers (TPE) or thermoplastic polyurethane (TPU) to withstand the toughest of dog chewers. The invention encompasses the use of all suitable rubber-like materials that are durable, of high strength, impact resistant but easy on teeth and gums of a dog and is dishwasher safe. The threaded lower portion of the annular first insert and the interior threading of the annular second insert are fabricated from nylon, acrylonitrile butadiene styrene (ABS), or other suitable rigid materials. In addition, the durable rotatable cap ensures that treats and food are locked inside the cylindrical body.

The plurality of vertical flanges 46 on the annular first insert 56 and the plurality of vertical flanges on the annular second insert 58 provide strong friction forces which ensure that the annular first insert 56 remains tightly in place within the annular skirt 37 of the annular top cap 59 and that the annular band 52 of the annular second insert 58 remains tightly in place within the cylindrical body 40 when a powerful dog chewer is playing with the toy. In addition, essentially there are no gaps present between the rotatable annular cap 34 and the cylindrical body 40 as well as no pull points for a dog to latch itself on. Further, the rounded design of the cylindrical body also prevents any pull points.

The injection molding process contemplated for use in the invention comprises an over molding process that is capable of manufacturing two different materials with the use of one mold. In the invention, the annular first insert 56, the middle portion 46 made of the rubber-like material is adjoined to the lower threaded portion 43 made of nylon or other suitable rigid material with the use of one mold, and in the annular second insert 58, the annular band 46 made of the rubber-like material is adjoined to the interior inner threading 53 made of nylon or other similar rigid material.

The dog puzzle chew toy of the invention may be fabricated in various sizes to accommodate a range of dog sizes, a dog's bite strength, as well as levels of difficulty for accessing the contents of the cylindrical body from its apertures. In addition, walls of the dog puzzle chew toy may be fabricated in variable thicknesses to maximize durability of the toy. For example, the wall thickness may range from about 0.1 inches thick to about 0.5 inches thick.

The dog puzzle chew toy is contemplated to withstand the bite strength of the strongest dog chewers, ranging from about 500 pounds per square inch (psi) and 1,000 psi. In an embodiment, the chew toy can withstand at least a bite strength of 750 psi. Examples of bite strengths of various dog breeds include Jack Russel (100-150 psi), English Bulldog (210 psi), Chow Chow (220 psi), Dutch Shepherd (224 psi), Doberman Pinscher (228 psi), Labrador Retriever (230 psi), Pit Bull (235 psi), Rottweiler (328 psi), English Mastiff (552 psi) and Cane Corso (700 psi).

While specific embodiments have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the (device) and method described herein, which is to be given the full breadth of the appended claims and any and all equivalents thereof.

What is claimed is:

1. A refillable dog puzzle chew toy device for powerful dog chewers, comprising:
   a cylindrical body having an open upper end and a closed lower end, said cylindrical body defining an interior opening therein, said cylindrical body having a plurality of apertures therethrough;
   a rotatable annular cap comprised of:
   an annular cap top comprised of an upper closed end and an annular skirt projecting downwardly, said annular cap top having a plurality of apertures therethrough, said annular skirt having a plurality of vertical grooves projecting outwardly;

an annular first insert having an upper portion, a middle portion, and a threaded lower portion, said upper portion having a plurality of flanges projecting upwardly, said middle portion comprised of an annular band having a plurality of vertical flanges projecting outwardly, each of the plurality of upwardly projecting flanges fitting into the plurality of corresponding apertures in the annular cap top; and an annular second insert comprising an annular band defining an interior threaded opening therein, said annular second insert having an upper end, a lower end, and a plurality of vertical flanges projecting outwardly from the annular band, said annular second insert positioned within the upper end of the cylindrical body, wherein the interior opening in the cylindrical body is configured to receive contents therein, wherein closure of the dog puzzle chew toy comprises threadably screwing the threaded lower portion of the annular first insert into the threading of the annular second insert, and wherein the plurality of apertures in the cylindrical body are configured to allow a dog access to the contents within the cylindrical body.

2. The device of claim 1, wherein the plurality of grooves in the annular cap top is configured to facilitate rotation of the annular rotatable cap by a user.

3. The device of claim 1, wherein the upper end of the cylindrical body is angled substantially outwardly and contains an aperture.

4. The device of claim 1, wherein fabrication of the multi-part device is accomplished by injection molding.

5. The device of claim 4, wherein fabrication of the middle portion of the annular first insert with its lower threaded portion and the annular band of the annular second insert with the interior threading of the annular second insert is accomplished using an over molding injection-molded process.

6. The device of claim 1, wherein the plurality of vertical flanges on the annular first insert and the plurality of vertical flanges on the annular second insert are configured to increase surface area which provides strong friction forces so that the annular first insert remains tightly and securely in place within the annular skirt of the annular top cap, and the annular band of the annular second insert remains tightly and securely in place within the cylindrical body.

7. The device of claim 1, wherein the plurality of shaped apertures of the cylindrical body comprises vertical openings, horizontal openings, round openings, square openings, rectangular openings, triangular openings, or combinations thereof.

8. The device of claim 1, wherein the annular cap top, the upper and middle portions of the annular first insert, the cylindrical body, and the annular band of the annular second insert are fabricated from rubber-like materials comprised of thermoplastic elastomers (TPE) or thermoplastic polyurethane (TPU), and wherein the threaded lower portion of the annular first insert and the interior threading of the annular second insert are fabricated from rigid materials comprised of nylon, acrylonitrile butadiene styrene (ABS), or other suitable rigid materials.

9. The device of claim 1, wherein the refillable dog puzzle toy is able to withstand a bite strength of a dog ranging between about 500 pounds per square inch (psi) and 1,000 psi.

10. The device of claim 9, wherein the refillable dog puzzle toy is able to withstand a dog's bite strength of about 750 psi.

11. The device of claim 1, wherein the body may be fabricated in different sizes and walls to accommodate a range of dog sizes, bite strengths, and level of difficulty to access the treats.

* * * * *